United States Patent [19]

Wolf et al.

[11] Patent Number: 4,975,890
[45] Date of Patent: Dec. 4, 1990

[54] UNDERWATER SOUND TRANSMITTING SYSTEM

[75] Inventors: Sylvan Wolf, College Park; Charles C. Vogt, Bethesda; Walter O. Allen, Silver Spring; Melvin W. Crawford, Brookeville; Robert D. Mattingly, Silver Spring; Donald M. Leslie, Silver Spring, all of Md.

[73] Assignee: The United States of America as represented by the Secretary of the Navy, Washington, D.C.

[21] Appl. No.: 28,170

[22] Filed: May 10, 1960

[51] Int. Cl.$^5$ .............................. G01S 15/00
[52] U.S. Cl. .................... 367/131; 367/137; 367/145
[58] Field of Search ............ 340/5, 2, 3, 4, 6; 102/7, 7.2, 11, 21.6, 13, 14, 16; 181/0.51; 367/131, 137, 145

[56] References Cited

U.S. PATENT DOCUMENTS

| | | | |
|---|---|---|---|
| 257,695 | 5/1882 | Haight | 102/409 |
| 1,295,213 | 2/1919 | Saladiner | 102/391 |
| 1,312,114 | 8/1919 | Harvey | 102/391 |
| 1,442,345 | 1/1923 | Kee | 102/412 |
| 1,459,793 | 6/1923 | Pape | 102/391 |
| 2,587,301 | 2/1952 | Ewing | 367/127 |
| 2,760,180 | 8/1956 | Sipkin | 367/2 |
| 2,942,545 | 6/1960 | Fogal et al. | 102/388 |
| 2,949,853 | 8/1960 | Vogt | 102/407 |

*Primary Examiner*—Thomas H. Tarcza
*Assistant Examiner*—Daniel T. Pihulic
*Attorney, Agent, or Firm*—Kenneth E. Walden

[57] ABSTRACT

An underwater signalling device to fire explosives at a preselected depth in a prearranged time sequence, which is intended to be part of an underwater sound communication system.

8 Claims, 4 Drawing Sheets

UNDERWATER SOUND TRANSMITTING SYSTEM

The invention described herein may be manufactured and used by or for the Government of the United States of America for governmental purposes without the payment of any royalties thereon or therefor.

This invention relates to a submarine underwater sound transmitting system and more particularly to an underwater sound transmitting device adapted to be launched by plane, ship or submarine, in which a plurality of signaling devices are exploded in successive order at a predetermined depth and in a timed sequence.

In accordance with the present invention, the underwater signaling device is constructed and arranged to be fired at a preselected depth in a prearranged timed sequence, thereby providing an underwater explosive sound transmitting system which is intended to be part of an underwater sound communication system capable of transmitting and receiving a limited amount of information between two underwater locations. The transmitting distance has a range of at least five hundred miles under good conditions. The signals from the signal device caused by the explosions travel along a sound channel at a predetermined depth within the body of water. The signals will be picked up by a hydrophone located on a submarine or other receiving station.

One of the objects of the present invention is to provide a new and improved underwater explosive signaling device.

Another object is to provide a new and improved underwater signaling device adapted to be launched in a body of water in which a plurality of small explosive charges are fired in a predetermined timed sequence.

Still another object is to provide a new and improved underwater signal device adapted to be launched from a plane, ship or submarine.

A still further object is to provide a signal device in which the time relation of the explosions may be varied over a predetermined time interval.

A still further object is to provide a submarine communication system using the signal device and at least one hydrophone wherein different messages may be relayed by variation of the explosion with relation to time.

Other objects and many of the attendant advantages of this invention will be readily appreciated as the same becomes better understood by reference to the following detailed description when considered in connection with the accompanying drawings wherein.

Figure 1:
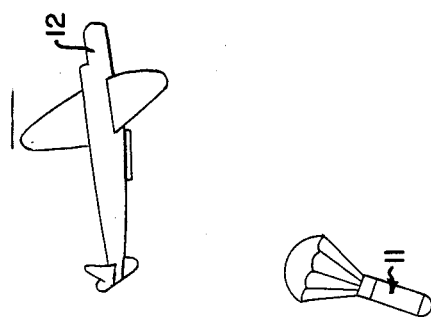
FIG. 1 is a pictorial diagrammatic view on which is shown the signaling device of the present invention being launched from an airplane and employed to transmit signals to a submarine.
Figure 1:
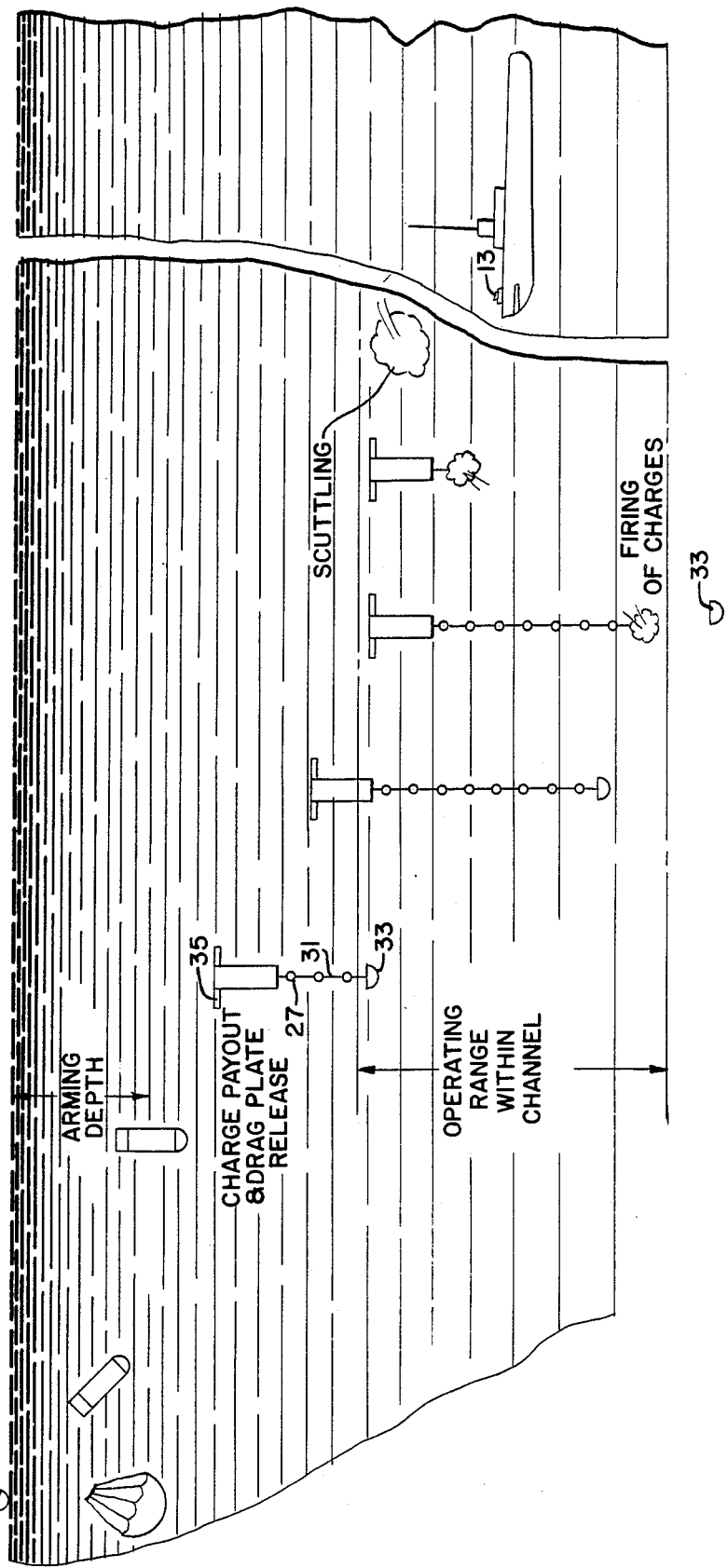

The underwater communication system relies on the sound waves being transmitted by the so-called bottom bounce, direct transmission and on the existence of permanent submarine sound channels to permit long range acoustic transmission at reasonable sound channels. The sound channels within the water generally have their origin in negative temperature gradients above regions of essentially constant temperature, in combination with the positive pressure gradient, resulting acoustic velocity profiles exhibit minimal loss at particular depths defined as sound channel axes. Sound signals tend to be refracted toward the channel axis from either greater or lesser depths, thereby greatly enhancing horizontal transmission.

Some ocean areas are characterized by multiple sound channels, others by none at all. So-called deep channels, found at depths of 300 meters or more, are regarded as permanent acoustic features from the standpoint of both incidence and configuration. Shallower channels may disappear entirely in winter, or they may be present always while varying substantially in depth. For a reliable long range communication system it is necessary that the channels always be found at some depth in its operational areas.

The basic acoustic structure of deep ocean areas above the latitude 75° is that of a "half channel" with the axis close to the surface. The term "half channel", as employed herein, may be defined to imply uniformly positive velocity gradients downward from the surface, so that sound is refracted upward from greater depths. This effect, together with the upper channel surface reflection, tends to enhance horizontal transmission, though not as efficiently as do fully submarine channels. Permanent channels at greater depths are found in this region only in those restricted areas where warmer water flowing from the Atlantic ocean through the Norwegian and Greenland Seas retains its identity.

Channel transmission is influenced markedly by bottom topography and areas of shallow water. The transmitters must be strategically located in operational areas to avoid such acoustic barriers.

Explosions at the sound channel axis are desirable for propagation of maximum energy. However, the depth of detonation can be as far below the sound channel axis as 1,000 feet without seriously reducing the transmission range. Depths of detonation of a few hundred feet above the channel axis have been found not to be detrimental.

The accuracy of timing of the detonations affects the minimum spacing between charges and a false alarm probability. The minimum spacing of detonations is determined by the maximum duration of the message, the timing accuracy and the number of codes available. A minimum spacing of thirty seconds between successive explosions has been found to be satisfactory.

The number of code combinations available is a function of the minimum spacing and the total message time. With a minimum spacing of thirty seconds, there are thirty time slots available in fifteen minutes.

If the permanent sound channels are utilized, the range for good communication is relatively insensitive to the charge weight. On the other hand, due to degradation of the signal with an omnidirectional hydrophone, a charge of approximately ten pounds is satisfactory.

The accompanying drawings, on which like numerals of reference are employed to designate like parts throughout the several views, display the general construction and operational principles of the invention.

Referring now to FIG. 1 for a better understanding of this invention which discloses the operational system of the device, the device 11 is dropped by an airplane 12.

The hydrophone 13 utilized in this system is an omnidirectional unit located on the bow of the submarine substantially as shown or otherwise permanently located in or near the sound channel, as the case may be.

Figure 2:
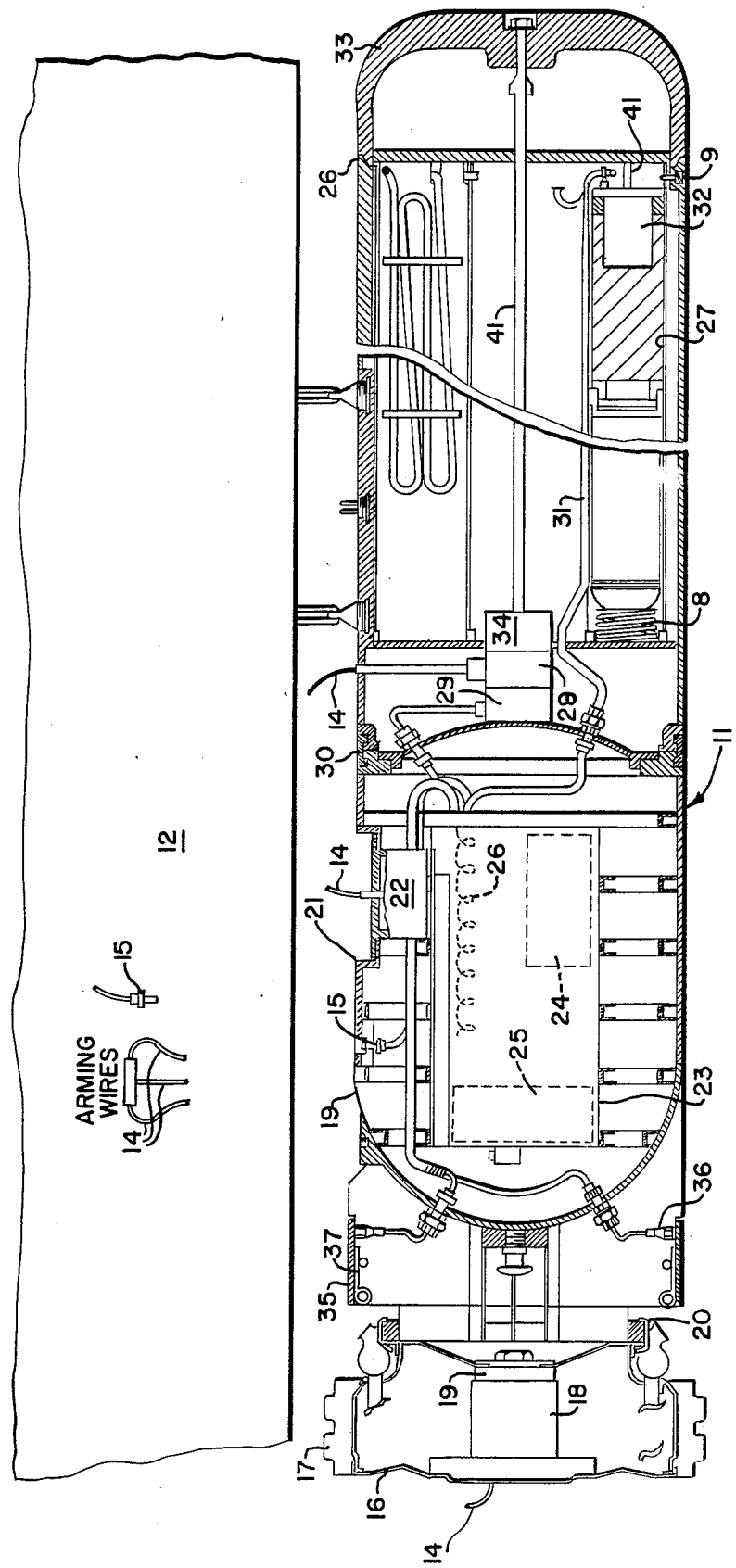
FIG. 2 is an elevational view partially in section and partially broken away of the signaling device of FIG. 1 and the airplane from which it is to be launched.

On FIG. 2 is shown the general arrangement of the device. The device 11 is dropped from the bomb bay rack of an airplane 12. As the device is dropped the arming wires 14 are withdrawn and the electrical connector including connector 15 for heating compartment 23 by heater 26 from a source of electrical power on the airplane is disconnected at connector 15. The parachute 16 is packed in container 17. The pack is controlled by control unit 18 which causes pack opener 19 to release. The parachute pack opener 19 operates and the parachute 16 is released and blossoms. The device is dropped slowly into the water. Upon the device entering the water the parachute release mechanism 20 separates the flight gear from the case of the device. A parachute release mechanism of the type used on this invention is well known in the art, therefore is not described in greater detail.

The instrument compartment 21 contains a depth sensing device 22 and an instrument rack 53. The instrument rack holds the programmer 24 and batteries 25. This unit also contains a heating element 26 which is utilized to keep the batteries warm and in working condition while in the plane.

A dispenser compartment 26 houses the individual charges 27 which are held in place by spring spacers 8 and detents 9.

The compartment also contains the system safety device 28, and the arming device 29. This compartment is connected to the instrument compartment 21 by clamping bands 30. The two-section case design provides additional safety and convenience by permitting assembly and setting of the mechanisms in the instrument compartment 21 which is separate from the high explosive charges 27. It further simplifies assembly of the charges and conserves magazine storage space.

The eight charges 27 are electrically and mechanically connected to the programmer 24 by a special cable 31 having electrical and mechanical connections to the programmer. Each charge contains its own safety and arming device 32.

The plummet 33, when released by the explosive power plummet release mechanism 34, pulls the charges 27 from the dispenser 26. This is a simple and positive method of stringing out the charges 27 in a vertical position in predetermined spaced relation. Drag plates 35 are extended outwardly by the drag plate explosive release mechanism 36 and are held extended by ejection springs 37. The drag plates help retard the package during its descent through the water in the sound channel.

As the device starts to sink it begins to arm. The switches of FIGS. 3 and 4 closes as follows:

1. The dashpot plunger 28 is actuated by hydrostatic pressure prior to alignment by sufficient hydrostatic pressure of a train of separate explosive charges (not shown) within the release mechanism 34 A sufficient uniform hydrostatic pressure on one or both sides of the train will provide the above alignment.

2. The out-of-line explosive train of the plummet release mechanism 34 is aligned by the hydrostatic pressure of the sea water. Alignment is a prerequisite to firing the release mechanism 34 to release the plummet 33.

3. A switch in the depth measuring device 22 is closed completing the circuit between the depth measuring device 22 and the programmer 24.

4. Sterilized switch 54 operates a predetermined time after a failure of the normal closing of scuttling switch 55.

At a predetermined depth sufficient hydrostatic pressure exists to align the out-of-line explosive train of the explosive charge arming device if the plummet is released.

At a predetermined fixed distance from the surface of the water a hydrostatic depth measuring device 22 completes a circuit to start the programmer 24. The programmer, for initiating the firing of individual charges is settable for seven independently variable intervals with the maximum interval being twelve minutes, the minimum interval being thirty seconds and a total time of fifteen minutes. The programmer closes switches to the explosive actuators 34 and 36 which release both the plummet 33 and the drag plates 35. The drag plates extend like fins out of the case into the water and retard the descent of the case.

The plummet 33 falls away from the case and pulls the explosive charges 27 out of the charge container on the attached cable, the charges being separated from each other by ten feet when the plummet line is taut. Removal of the plummet allows the explosive charge arming devices to align their respective explosive detonators 42 and permits closure of hydrostatic switch 39.

At a fixed timed interval after the plummet is released the programmer closes the switch to fire the first charge. The plummet is cut loose by the explosion of the first charge and falls to the bottom. Release of the plummet further retards the rate of descent of the unit.

Figure 3:
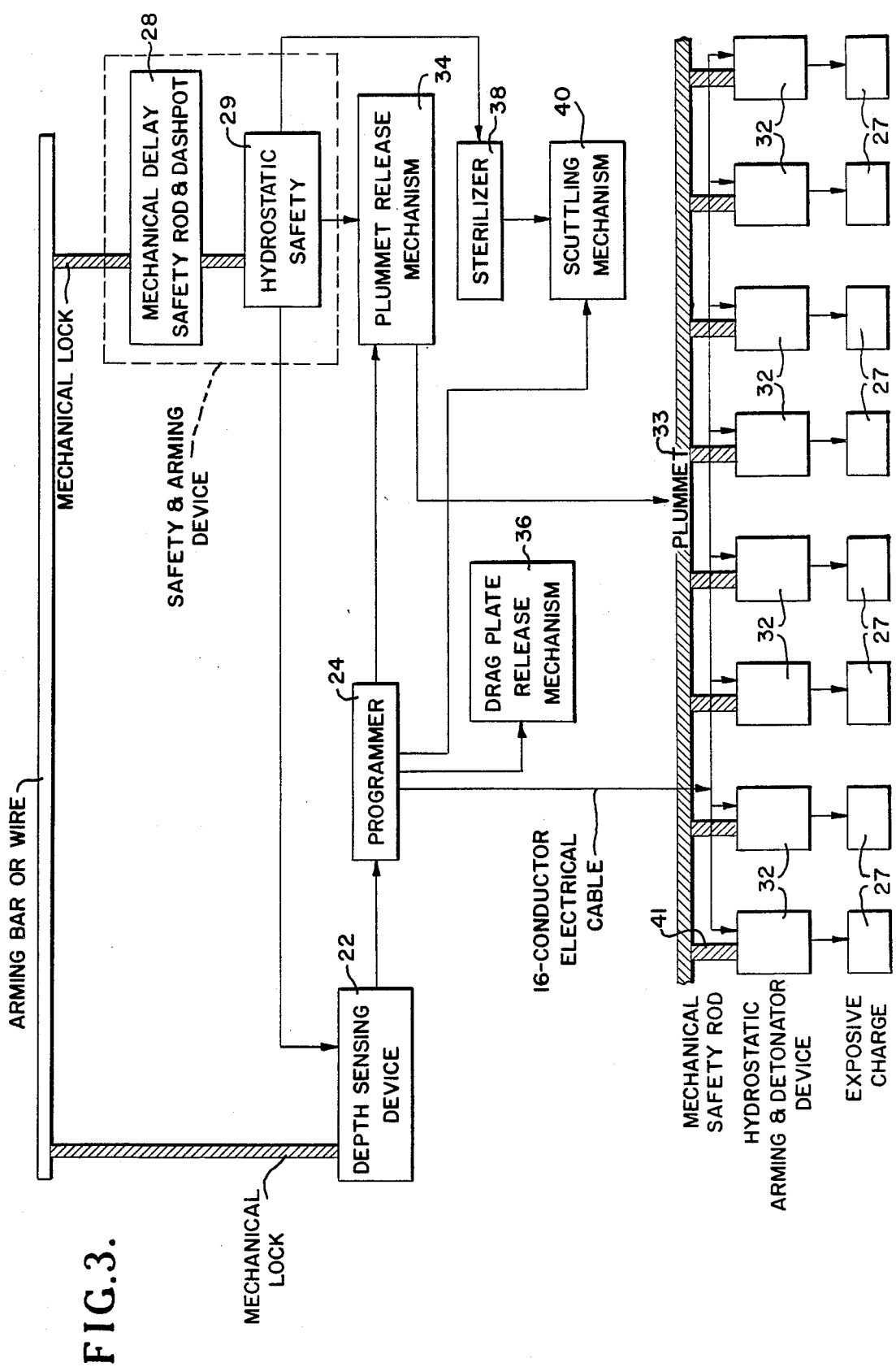
FIG. 3 is a block diagram of the device of FIG. 2.
Figure 4:
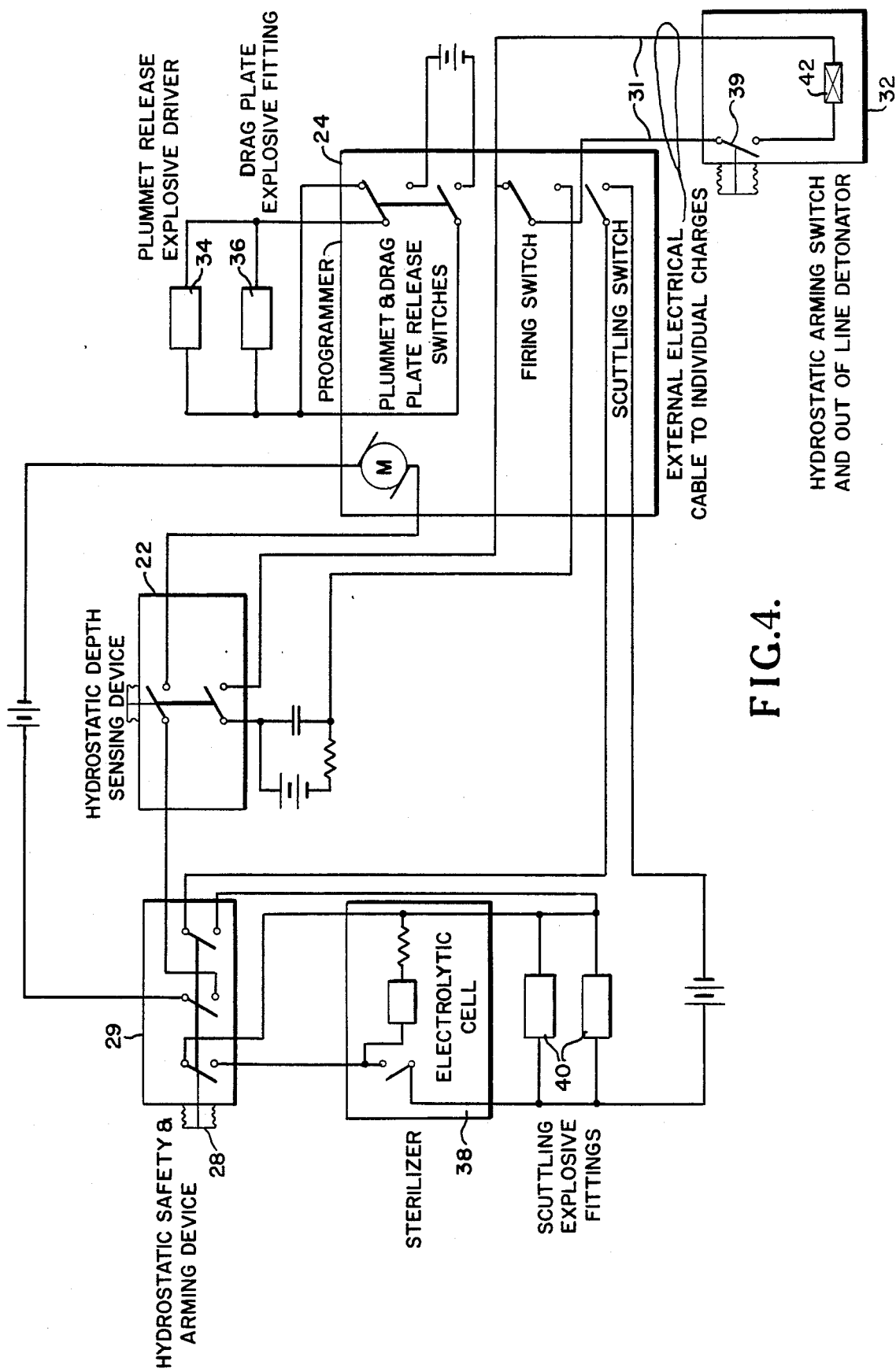
FIG. 4 is a circuit diagram suitable for use with the device in FIG. 2.

The programmer continues to fire the second through the eighth charges in sequence while they are in the channel. The sequential firing of the individual charges 27 coupled to arming devices 32 through conductors 31 may be effected, for example, by connecting the individual firing switches shown in FIG. 4 to a stepping switch driven by motor M. Other timing devices may be used in programmer 24 in place of the stepping switch and connected between the individual firing switches and motor M. This type of electromechanical connection to the firing switches as well as the scuttling switch and the plummet and drag plate release switch is represented by the dashed lines within the programmer 24 as shown in FIG. 4. When a multi-terminal stepping switch is employed in the programmer 24 and there are eight explosive charges 27 as shown in FIG. 3, seven independent firing intervals may be selected prior to launching of the device. The programmer closes a switch which fires two scuttlers 40, either of which is capable of flooding the buoyancy chamber and causing it to sink to the bottom. If the programmer fails, an independent sterilizer circuit 38 will detonate the scuttlers. The electrolytic cell of the sterilizer 38 will close switch 54 a fixed time delay after the failure of scuttling switch 55 to operate. Sterilizer circuit 38 is an alternative means for sinking the buoyancy chamber, and the closure of switch 54 connects battery 56 across the explosive fittings 40 to complete the firing circuit therefor. This switching action provided by the electrolytic cell is well known in the art and disclose in the Kissinger et al U.S. Pat. No. 2,526,670 issued Oct. 24, 1950.

While the described launching utilizes a drop from an airplane it is to be understood that the device may be launched by other means such as from a surface vessel or a submarine. The launching from a surface vessel or submarine is the same as an air drop except a parachute is not required and the arming wires are replaced by an arming bar. The arming bar falls free as the unit is launched.

It is also considered obvious that a buoyant package containing separate individual charges may be utilized. The programmer in this case would release the individual charges at timed intervals which charges are dropped to the proper depth and exploded without a connecting cable secured thereto.

It is considered obvious that many modifications of this device may be made without departing from the spirit of this invention.

Such modifications include a positively buoyant package being supported on the surface of the water and containing separate individual charges. The programmer in this case would release the individual charges at timed intervals and the charges are dropped to a proper depth and exploded without a connecting cable secured thereto.

A further modification would be to have a neutrally buoyant package at or near the sound channel with the various charges on an individual cable electrically fired by the programmer or having individual charges released at time intervals and dropped to a proper depth and exploded without a connecting cable.

While the present invention has been described with particular reference to eight explosive charges which are fired by a programmer in successive order at predetermined intervals, it is not so limited as to the number of charges to be fired which may be increased or decreased at will, it being merely necessary to provide space in said container to store the charges initially and to provide a programmer having the requisite means for firing in the charges in succession.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An underwater communication system comprising an omni-directional hydrophone mounted on a submarine or otherwise located near a sound channel, a signal device, said signal device including parachute means for launching said device from an airplane into a body of water, disconnecting means for releasing said device from the parachute means, container means for encasing said signal device, drag plate means located on said container means for retarding the rate of descent of said device in said water, a cable, a plurality of charges normally located in said container means and being electrically and mechanically attached to said cable, a plummet means releasably connected to said container means and being attached to one end of said cable for pulling out and aligning said plurality of charges when said plummet is released, a programmer electrically connected to the other end of said cable for firing said charges in a predetermined schedule in their aligned positions, means for energizing said programmer at a predetermined depth whereby the firing of said explosive charges generate a sound that is transmitted in said sound channel and received by said hydrophone.

2. A signaling device adapted to be launched in a body of water and comprising a casing, a plurality of charges, a cable electrically and mechanically attached to said charges at spacially predetermined intervals, plummet means releasably located on one end of said casing and having one end of said cable attached thereto for pulling said charges out of said casing when said plummet is released, drag plate means releasably located at the other end of said casing for retarding the rate of descent of said casing in the water when released, means including a programmer located in said casing and having circuit closing means for releasing said drag plates and said plummet, contact means in said programmer for detonating said charges on said cable in a predetermined schedule, a scuttling circuit for scuttling said casing, and means in said programmer for closing said scuttling circuit.

3. A signaling device adapted to be launched in a body of water from an airplane comprising a casing, a parachute means attached to said casing for retarding the rate of free flight of said casing, means for disengaging said parachute means from said casing upon impact of the water, a programmer located in said casing, a source of power, means for connecting said source of power to said programmer, a plurality of charges normally located in said casing, cable means electrically connected at one end to said programmer and mechanically attached to said casing, means for attaching said plurality of charges electrically and mechanically to said cable means, plummet means normally attached to one end of said casing and mechanically attached to the other end of said cable for pulling said charges from said casing when the plummet means is released, whereby when said plummet means is released from the normal position thereof by said programmer, said charges are pulled out of the casing and aligned at intervals on said cable, drag plate means located on the other end of said casing and actuated by said programmer, for retarding the rate of descent of said device in the water, said programmer causing said charges when aligned on said cable to detonate in a predetermined schedule, and scuttling means carried by said casing for scuttling said casing after said charges have been detonated.

4. A signaling device adapted to be launched and thereafter fired near a sound channel of a body of water, said device comprising a casing, a programmer located in said casing, hydrostatic means for energizing said programmer at a predetermined water depth, a plurality of explosive means normally located in said casing, a plummet releasably located on one end of said casing, means controlled by said programmer for releasing said plummet, cable means having one end attached to said plummet, said plurality of explosive means being intermediately spaced on said cable and mechanically and electrically attached thereto, the other end of said cable being mechanically attached to said casing and electrically connected to said programmer, drag plate means electrically connected to said programmer for retarding the descent of said casing through the water whereby at a predetermined depth said plummet is released pulling out and aligning said plurality of explosive means in a vertical line on said cable, concurrently therewith the drag plate means is energized by said programmer retarding the rate of descent of said casing, said programmer detonating each of said plurality of explosive means in a predetermined time relation and scuttling means carried by said casing for scuttling the casing when all the explosive means have been detonated.

5. The signaling device of claim 4 wherein each of said plurality of explosive means includes a hydrostatic safety and arming device.

6. A signal device of claim 4 wherein the drag plate means comprises a plurality of drag plates, explosive release mechanism for maintaining said drag plates in a normal position and for releasing said plates when energized by said programmer; and spring bias means for extending and holding said drag plates in a released extended position when released by said release mechanism.

7. The signaling device of claim 4 wherein the said plurality of explosive means includes individual dispensers within said casing, an explosive charge within each of said dispensers, a spacer spring mounted within said dispenser adjacent one end of said explosive charge and a spring loaded detent mounted within said dispenser adjacent the other end of said explosive charge for preventing movement of said explosive charge within each of said dispensers until said plummet is released.

8. The signaling device of claim 4 wherein said plummet comprises a spheriod having a shaft medially attached thereto, said shaft extending along the longitudinal axis of said casing and held in place by said plummet release mechanism thereby normally maintaining said plummet on the end of said casing.

* * * * *